United States Patent
Ball

(10) Patent No.: US 9,716,403 B2
(45) Date of Patent: Jul. 25, 2017

(54) BATTERY CHARGER CIRCUIT FOR CHANGING BETWEEN MODES DURING OPERATION BASED ON TEMPERATURE AND BATTERY VOLTAGE AND METHOD THEREFOR

(75) Inventor: Alan R. Ball, Gilbert, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 755 days.

(21) Appl. No.: 12/277,621

(22) Filed: Nov. 25, 2008

(65) Prior Publication Data

US 2010/0127666 A1 May 27, 2010

(51) Int. Cl.
| | | |
|---|---|---|
| *H02J 7/04* | (2006.01) | |
| *H02J 7/00* | (2006.01) | |
| *H02M 3/158* | (2006.01) | |
| *H02M 1/00* | (2006.01) | |
| *H02M 1/32* | (2007.01) | |

(52) U.S. Cl.
CPC .............. *H02J 7/045* (2013.01); *H02J 7/008* (2013.01); *H02J 7/0073* (2013.01); *H02J 7/047* (2013.01); *H02M 3/158* (2013.01); *H02J 2007/0059* (2013.01); *H02J 2007/0062* (2013.01); *H02M 2001/0045* (2013.01); *H02M 2001/327* (2013.01)

(58) Field of Classification Search
CPC .................................. H02J 7/045; H02J 7/047
USPC ................ 320/134, 138–145, 150, 152, 153, 320/DIG. 12, DIG. 27
See application file for complete search history.

(56) References Cited

U.S. PATENT DOCUMENTS

| | | | | |
|---|---|---|---|---|
| 4,712,055 A | * | 12/1987 | Houser, Jr. .................... | 320/144 |
| 5,034,676 A | * | 7/1991 | Kinzalow ...................... | 323/268 |
| 5,309,082 A | | 5/1994 | Payne | |
| 5,548,204 A | | 8/1996 | Armstrong, II et al. | |
| 5,670,863 A | * | 9/1997 | Broell et al. .................. | 320/145 |
| 5,949,216 A | | 9/1999 | Miller ........................... | 320/125 |
| 6,040,684 A | * | 3/2000 | Mitchell ............... | H01M 10/44 320/139 |
| 6,144,187 A | * | 11/2000 | Bryson ......................... | 320/137 |
| 6,229,289 B1 | * | 5/2001 | Piovaccari et al. .......... | 323/268 |
| 6,452,368 B1 | | 9/2002 | Basso et al. | |
| 6,636,023 B1 | | 10/2003 | Amin | |
| 6,844,705 B2 | * | 1/2005 | Lai ........................ | H02J 7/0055 320/137 |
| 7,098,636 B2 | * | 8/2006 | Koerner et al. ............. | 323/268 |

(Continued)

*Primary Examiner* — Richard Isla Rodas
*Assistant Examiner* — Manuel Hernandez
(74) *Attorney, Agent, or Firm* — Polansky & Associates, P.L.L.C.; Paul J. Polansky

(57) ABSTRACT

A battery charger circuit includes a transistor having a first current electrode for receiving a charging voltage, a control electrode for receiving a control signal, and a second current electrode for providing an output voltage. The battery charger circuit further includes a rectifier having a terminal coupled to the second current electrode of the transistor, and another terminal coupled to a power supply voltage terminal. The battery charger circuit also includes a control and regulation circuit having an input for receiving a feedback signal representative of a temperature, and an output for providing the control signal. The control and regulation circuit operates in either a switching mode or a linear mode in response to the feedback signal.

20 Claims, 3 Drawing Sheets

(56) References Cited

U.S. PATENT DOCUMENTS

| | | |
|---|---|---|
| 7,253,589 B1 | 8/2007 | Potanin |
| 7,498,769 B1* | 3/2009 | Potanin et al. ............... 320/125 |
| 7,560,898 B1* | 7/2009 | Kranzen et al. .............. 320/107 |
| 7,948,212 B2* | 5/2011 | Odaohhara ......... H01M 10/441 |
| | | 320/128 |
| 2004/0100231 A1* | 5/2004 | Koerner et al. .............. 323/265 |
| 2008/0024089 A1* | 1/2008 | Meng et al. .................. 320/128 |
| 2008/0258687 A1* | 10/2008 | So et al. ....................... 320/145 |
| 2009/0033289 A1* | 2/2009 | Xing et al. .................... 320/140 |
| 2010/0231172 A1* | 9/2010 | Bastami et al. .............. 320/137 |

\* cited by examiner

BATTERY CHARGER CIRCUIT FOR CHANGING BETWEEN MODES DURING OPERATION BASED ON TEMPERATURE AND BATTERY VOLTAGE AND METHOD THEREFOR

FIELD OF THE DISCLOSURE

The present disclosure relates generally to battery chargers, and more particularly to multiple mode battery chargers.

BACKGROUND

An electronic device such as cell phone typically includes a internal rechargeable battery to allow portability. Selecting a suitable battery charger typically requires that one make a compromise between particular advantages and disadvantages present in each type of charger. For example, a switching mode battery charger can operate efficiently and charge the battery relatively quickly, but can produce interference resulting in noise during operation of the device. A linear mode battery charger is considerably less efficient than a switching mode battery charger, and therefore may be unable to charge the battery quickly without overheating the charger. However, a linear mode battery charger typically does not introduce interference.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items.

DETAILED DESCRIPTION

A battery charger that automatically selects between one of four operating modes is disclosed. The battery charger can operate in a linear mode or in a switching mode, and in either mode can provide constant-current or constant-voltage regulation. The battery charger can automatically switch between the four operating modes based on feedback signals indicating the current delivered to the battery, the battery voltage, and a temperature such as the temperature of the battery charger integrated circuit. The charging mode is also determined based on whether the battery charger is receiving power from a mains-connected source, or from a universal serial bus (USB) peripheral adapter.

Figure 1:
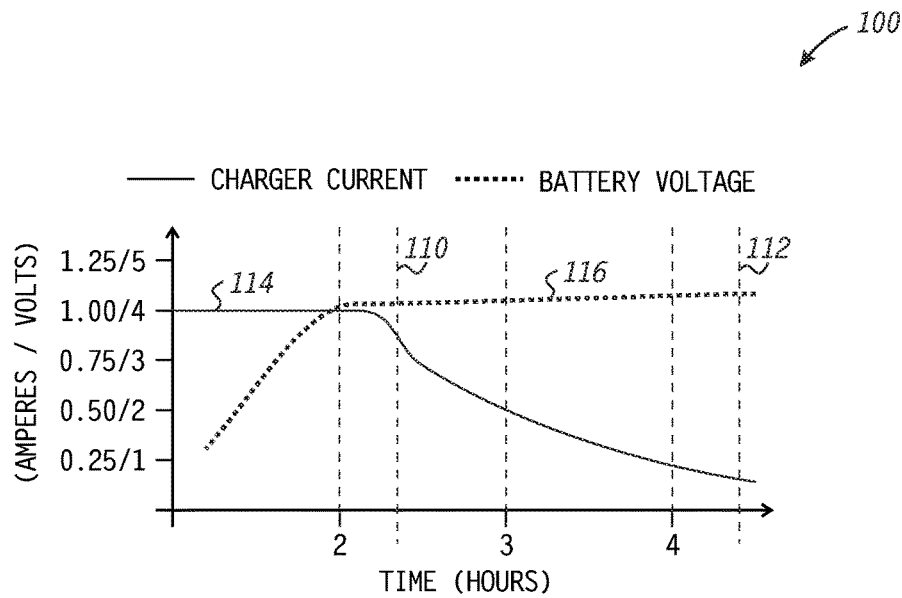
FIG. 1 is a graph illustrating charge states of a battery charger.

FIG. 1 is a graph 100 illustrating charging states of a battery. Graph 100 has a horizontal axis representing time in hours, and a vertical axis representing signal amplitude in either amperes or volts as appropriate. Graph 100 includes a waveform 114 representing the current provided to the battery by the battery charger in amperes, a waveform 116 representing the voltage at the battery in volts, and time references 110 and 112.

Graph 100 illustrates a scenario where a substantially discharged battery is connected to the battery charger. The battery voltage is initially approximately one volt and increases as the battery is charged. The current delivered to the battery remains at an elevated level until the battery voltage approaches the nominal operating voltage of this particular battery. At time reference 110, the battery voltage has increased to approximately 4.2 volts, and the current delivered to the battery begins to decrease. The battery is not yet fully charged, as indicated by the fact that the battery charger is still supplying approximately 0.8 amperes of current to the battery. The current delivered to the battery continues to decrease as the battery approaches a state of full charge. At time reference 112, the battery is substantially fully charged and is charging at a rate of approximately 0.1 ampere of current.

Figure 2:
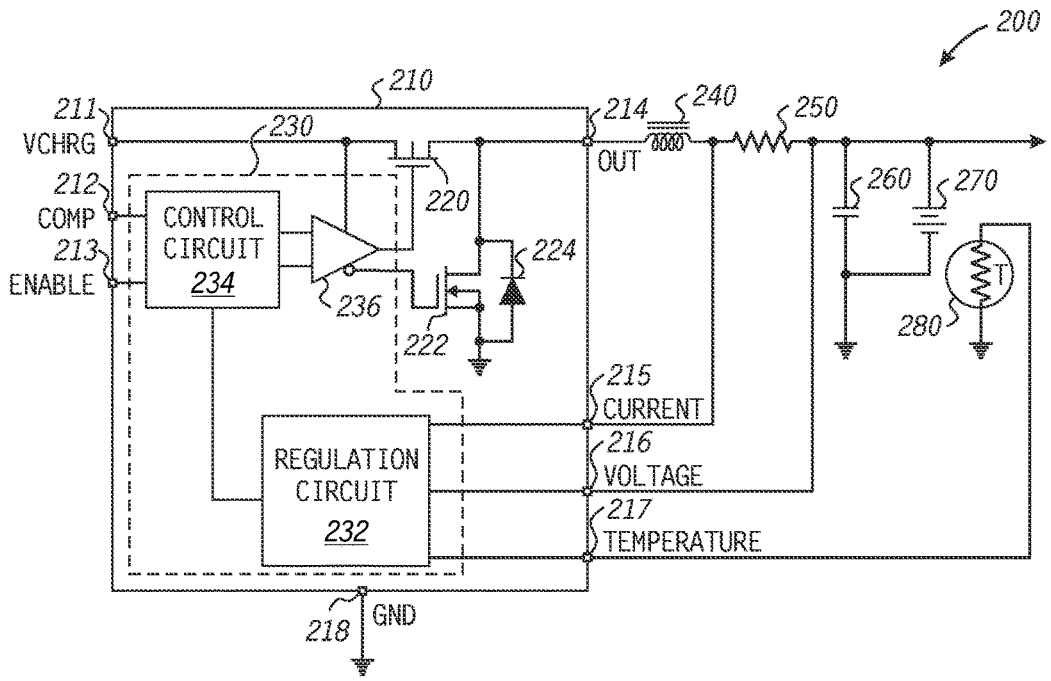
FIG. 2 illustrates in partial block diagram and partial schematic form a battery charger adapted to charge a battery according to the present invention.

FIG. 2 illustrates in partial block diagram and partial schematic form a battery charger 200 adapted to charge a battery 270 according to the present invention. Battery charger 200 includes a battery charger circuit 210, an inductor 240, a resistor 250, a capacitor 260, and a temperature sensor 280. Battery charger circuit 210 is an integrated circuit that includes an input terminal 211 for receiving a signal labeled "VCHRG," an input terminal 212 for receiving a signal labeled "COMP," an input terminal 213 for receiving a signal labeled "ENABLE," an output terminal 214 for providing a signal labeled "OUT," an input terminal 215 for receiving a signal labeled "CURRENT," an input terminal 216 for receiving a signal labeled "VOLTAGE," an input terminal 217 for receiving a signal labeled "TEMPERATURE," and an input terminal 218 for receiving a signal labeled "GND." Battery charger circuit 210 further includes a control and regulation circuit 230, a transistor 220, and a rectifier than can take the form of either a transistor 222 to implement a synchronous rectifier, or a diode 224. Control and regulation circuit 230 includes a regulation circuit 232, a control circuit 234, and a dual-mode driver 236.

Control circuit 234 has a first input connected to input terminal 212, a second input connected to input terminal 213, a third input, a first output, and a second output. Dual-mode driver 236 has a first input connected to the first output of control circuit 234, a second input connected to the second output of control circuit 234, a third input connected to input terminal 211, a first output, and a second output. Transistor 220 has a drain connected to input terminal 211, a gate connected to the first output of dual-mode driver 236, and a source connected to output terminal 214. Transistor 222 has a drain connected to output terminal 214, a gate connected to the second output of dual-mode driver 236, and a source connected to ground. Diode 224 has a cathode connected to output terminal 214, and an anode connected to ground. Regulation circuit 232 has a first input connected to input terminal 215, a second input connected to input terminal 216, a third input connected to input terminal 217, and an output connected to the third input of control circuit 234.

Inductor 240 has a first terminal connected to output terminal 214 of battery charger circuit 210, and a second terminal connected to input terminal 215 of battery charger circuit 210. Resistor 250 has a first terminal connected to the second terminal of inductor 240, and a second terminal connected to input terminal 216 of battery charger circuit 210. Capacitor 260 has a first terminal connected to the second terminal of resistor 250, and a second terminal connected to ground. Battery 270 has a positive terminal connected to the second terminal of resistor 250, and a negative terminal connected to ground. Temperature sensor 280 has a first terminal connected to input terminal 217 of battery charger circuit 210, and a second terminal connected to ground.

Battery charger circuit 210 can operate in four modes: 1) switching mode with constant current regulation, 2) switching mode with constant voltage regulation, 3) linear mode with constant current regulation, and 4) linear mode with constant voltage regulation. Switching mode is best suited for efficiently charging a battery at a relatively high rate. Linear mode typically produces negligible interference, but is less efficient than switching mode. Control and regulation circuit 230 monitors feedback signals, which include the current delivered to the battery during charging, the battery voltage, and the temperature of power dissipating devices contained in battery charger circuit 210. In addition, control and regulation circuit 230 detects if a mains-powered power supply (or another source capable of providing relatively high current) is providing charging voltage VCHRG, or whether a USB peripheral adapter, which has a relatively limited current capability, is providing charging voltage VCHRG. Control and regulation circuit 230 uses all of this information to appropriately adjust between the four operating modes.

When battery charger circuit 210 is operating in linear mode, the first output of dual-mode driver circuit 236 provides a variable analog direct-current voltage to the gate of transistor 220. Control and regulation circuit 230 adjusts the conductivity of transistor 220 to maintain the voltage potential at output terminal 214 at a desired level when battery charger circuit 210 is operating in a constant-voltage regulation mode. Control and regulation circuit 230 adjusts the conductivity of transistor 220 so that the current sourced at output terminal 214 remains substantially constant when battery charger circuit 210 is operating in a constant-current regulation mode. When battery charger circuit 210 is operating in linear mode, the second output of dual-mode driver 236 is inactive and set to ground potential, and transistor 222 remains nonconductive. The level of voltage at the gate of transistor 220 determines the level of current conducted by transistor 220 when battery charger circuit 210 is operating in linear mode. Transistor 220 is therefore operating in the linear region. In the illustrated embodiment, transistor 220 is a metal-oxide-semiconductor (MOS) field effect transistor, but in other embodiments can be a bipolar junction transistor, or another device capable of conducting current in a linear region when operating in linear mode, and switching at a suitable frequency when operating in switching mode.

When battery charger circuit 210 is operating in linear mode, inductor 240 presents minimal resistance to the charging current provided at output terminal 214. Resistor 250 is a current-sense resistor. Battery charger 210 monitors a voltage across input terminals 215 and 216, and this voltage is proportional to the current flowing through resistor 250. Thus, battery charger 210 has an indication of the current delivered to battery 270 by monitoring the voltage across resistor 250. Battery charger 210 monitors the voltage at battery 270 via input terminal 216.

When battery charger circuit 210 is operating in switching mode, the first output of dual-mode driver 236 provides a digital pulse-width modulated (PWM) signal with a variable duty cycle. The second output of dual-mode driver 236 provides a signal that is the logical inverse of the signal provided at the first output of dual-mode driver 210. Transistor 220 is conductive when the first output of dual-mode driver 236 is at a logic-high level. At the same time, the second output of dual-mode driver 236 is at a logic-low level, which makes transistor 222 nonconductive. Transistor 220 is non-conductive when the first output of dual-mode driver 236 is at a logic-low level. At the same time, the second output of dual-mode driver 236 is at a logic-high level and makes transistor 222 conductive. Diode 224 becomes conductive when the potential at output terminal 214 drops to more than the threshold-voltage of diode 224 below ground potential. Transistor 222 is superior to diode 224 at preventing the signal at output terminal 214 from dropping below ground potential when transistor 220 is suddenly turned off. In the illustrated embodiment, diode 224 is a parasitic device formed between the body and channel of transistor 222.

Battery charger circuit 210 and inductor 240 together implement a buck-regulator when operating in switching mode. Capacitor 260, in combination with inductor 240, implements a filter to minimize high-frequency interference created by the switching regulator. Resistor 250 provides an indication of the current delivered to the battery, as previously described. Control and regulation circuit 230 adjusts the duty cycle of dual-mode driver 236 to control the charging voltage when operating in a constant-voltage mode, or to control the charging current in a constant-current mode. Input terminal 212 is used to provide compensation to insure stability of the regulation feedback loop during operation in any mode. For example, a reactive circuit network including a capacitor, an inductor, or both, can be connected to terminal 212.

In another embodiment, the devices illustrated at FIG. 2 can be integrated within a battery pack that includes battery 270. Furthermore, transistor 220, transistor 222, inductor 240, resistor 250, capacitor 260, and temperature sensor 280 can be physically integrated as part of battery charger circuit 210 or can be discrete devices separate from control and regulation circuit 230. While shown as a single integrated circuit, in other embodiments battery charger circuit 210 may be implemented as multiple integrated circuits.

Figure 3:
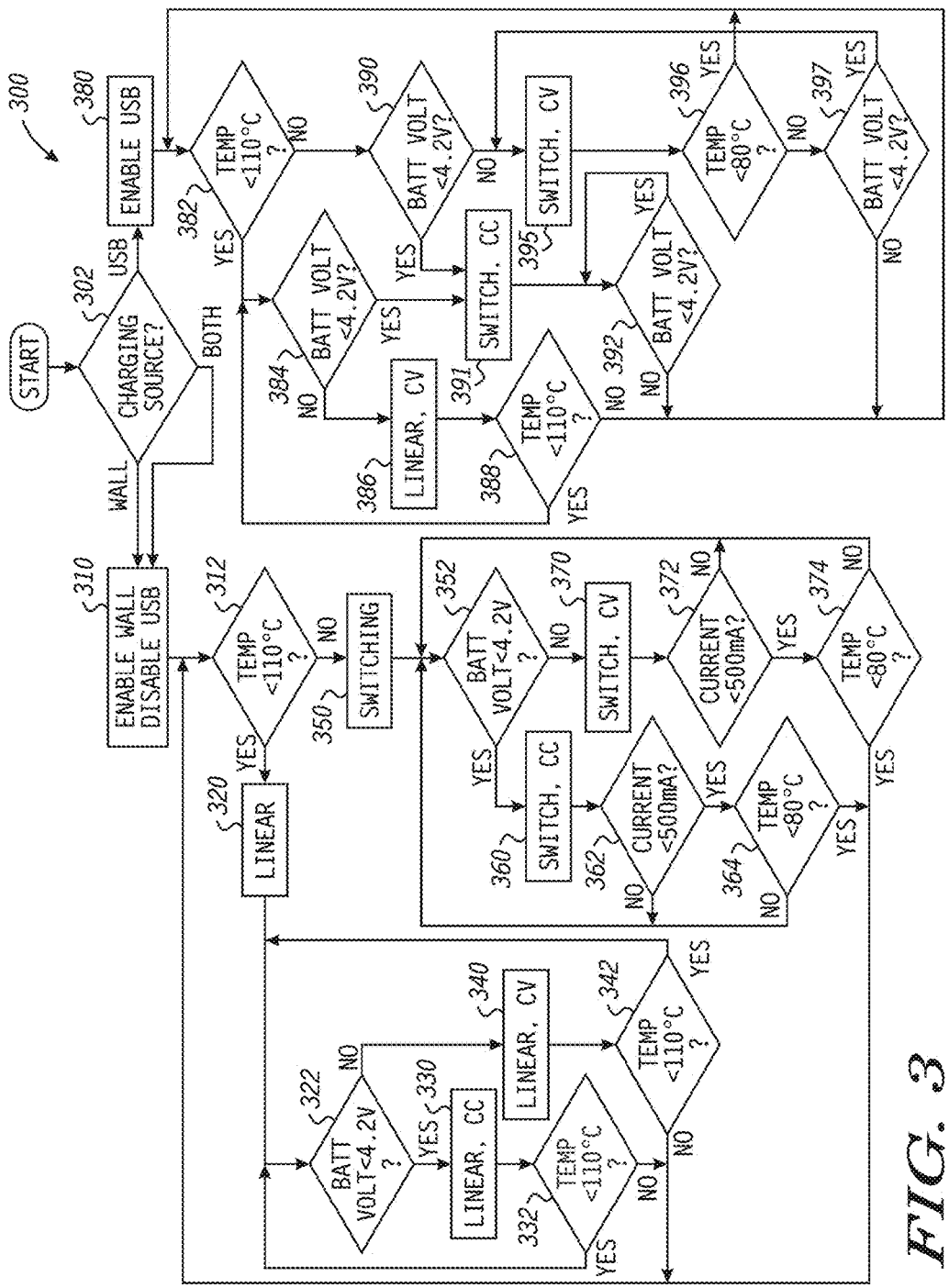
FIG. 3 is a flow diagram illustrating the operation of the battery charger of FIG. 2.

FIG. 3 is a flow diagram 300 illustrating the operation of battery charger 200 of FIG. 2. Flow diagram 300 begins at a decision block 302 where control and regulation circuit 230 determines whether a mains-connected power supply, a USB peripheral adapter, or both, are providing signal VCHRG. If a mains-powered (or an alternate source capable of suitable supply current such as an automobile battery) is providing signal VCHRG, the flow proceeds to block 310 where battery charger circuit 210 operates from mains (wall) power, and the USB input is disabled if present. The flow proceeds to decision block 312 where regulation circuit 232 determines the operating temperature of battery charger circuit 210 using temperature sensor 280. If the operating temperature is below 110° C., the flow proceeds to block 320 where regulation circuit 232 configures control circuit 234 to operate in the linear mode.

The flow proceeds to decision block 322 where regulation circuit 232 determines the voltage at battery 270. If the battery voltage is below the nominal voltage threshold of battery 270 (4.2 volts in this example), the flow proceeds to block 330 where control and regulation circuit 230 operates using constant-current regulation in linear mode. The flow proceeds to decision block 332 where regulation circuit 232 monitors the temperature of battery charger circuit 210. If the temperature is still below 110° C., the flow returns to decision block 322. If the temperature is no longer below 110° C., the flow returns to decision block 312. Returning to decision block 322, if the voltage at battery 270 is not less than 4.2 volts, the flow proceeds to block 340 where control and regulation circuit 230 operates using constant-voltage regulation in linear mode. The flow proceeds to decision block 342 where regulation circuit 232 monitors the temperature of battery charger circuit 210. If the temperature is still below 110° C., the flow returns to decision block 322. If the temperature is no longer below 110° C., the flow returns to decision block 312.

Returning to decision block 312, if the operating temperature is not below 110° C., the flow proceeds to block 350 where regulation circuit 232 configures control circuit 234 to operate in switching mode. The flow proceeds to decision block 352 where regulation circuit 232 determines the voltage of battery 270. If the battery voltage is below 4.2 volts, the flow proceeds to block 360 where control and regulation circuit 230 operates using constant-current regulation in switching mode. The flow proceeds to decision block 362 where regulation circuit 232 determines the current delivered to battery 270. If the battery current is not less than 500 milliamperes (mA), the flow returns to decision block 352. If the battery current is less than 500 mA, the flow proceeds to decision block 364 where control and regulation circuit 230 determines the temperature of battery charger circuit 210. If the temperature of battery charger circuit 210 is less than 80° C., the flow returns to decision block 312. If the temperature of battery charger circuit 210 is not less than 80° C., the flow returns to decision block 352. Thus, control and regulation circuit 230 implements temperature hysteresis.

Returning to decision block 352, if the battery voltage is not below 4.2 volts, the flow proceeds to block 370 where control and regulation circuit 230 operates using constant-voltage regulation in switching mode. The flow proceeds to decision block 372 where regulation circuit 232 determines the current delivered to battery 270. If the battery current is not less than 500 mA, the flow returns to decision block 352. If the battery current is less than 500 mA, the flow proceeds to decision block 374 where control and regulation circuit 230 determines the temperature of battery charger circuit 210. If the temperature of battery charger circuit 210 is less than 80° C., the flow returns to decision block 312. If the temperature of battery charger circuit 210 is not less than 80° C., the flow returns to decision block 352.

Returning to decision block 302, if only a USB adapter is providing signal VCHRG, then the flow proceeds to block 380 where battery charger circuit 210 operates from USB power. The flow proceeds to decision block 382 where control and regulation circuit 230 determines the temperature of battery charger circuit 210. If the temperature of battery charger circuit 210 is less than 110° C., the flow proceeds to decision block 384, where regulation circuit 232 determines the voltage at battery 270. If the battery voltage is not below 4.2 volts, the flow proceeds to block 386 and control and regulation circuit 230 operates using constant-voltage regulation in linear mode. The flow proceeds to decision block 388 where control and regulation circuit 230 determines the temperature of battery charger circuit 210. If the temperature of battery charger circuit 210 is less than 110° C., the flow returns to decision block 384. If the temperature of battery charger circuit 210 is not less than 110° C., the flow returns to decision block 382. Returning to decision block 384, if the battery voltage is below 4.2 volts, the flow proceeds to block 391 and control and regulation circuit 230 operates using constant-current regulation in switching mode.

Returning to decision block 382, if the temperature of battery charger circuit 210 is not less than 110° C., the flow proceeds to decision block 390, where regulation circuit 232 determines the voltage at battery 270. If the battery voltage is below 4.2 volts, the flow proceeds to block 391 and control and regulation circuit 230 operates using constant-current regulation in switching mode. The flow proceeds to decision block 392 where regulation circuit 232 determines the voltage at battery 270. When the voltage of battery 270 is not less than 4.2 volts, the flow returns to decision block 382. Returning to decision block 390, if the voltage of battery 270 is not below 4.2 volts, the flow proceeds to block 395 and control and regulation circuit 230 operates using constant-voltage regulation in switching mode. The flow proceeds to decision block 396 where control and regulation circuit 230 determines the temperature of battery charger circuit 210. If the temperature of battery charger circuit 210 is less than 80° C., the flow returns to decision block 382. If the temperature of battery charger circuit 210 is not less than 80° C., the flow proceeds to decision block 397 where regulation circuit 232 determines the voltage at battery 270. If the voltage at battery 270 is less than 4.2 volts, the flow returns to block 395. If the voltage at battery 270 is not less than 4.2 volts, the flow returns to decision block 382.

The preceding example illustrates one embodiment of a battery charger that monitors battery voltage, charging current, charger temperature, and source supply power to dynamically adjust the battery charger's operating mode. Note that control and regulation circuit 230 adjusts the operating mode that is best suited for a specific product implementation, battery type, ambient temperature, and particular operating situation. In another embodiment, transitioning from switching mode to linear mode is based on a battery current that is a desired fraction of a current threshold that previously caused a transition into switching mode. In yet another embodiments, control and regulation circuit 230 can include additional sensors. For example, regulation circuit 232 can monitor an additional temperature sensor that is in close proximity to battery 270 to determine the temperature of battery 270.

Figure 4:
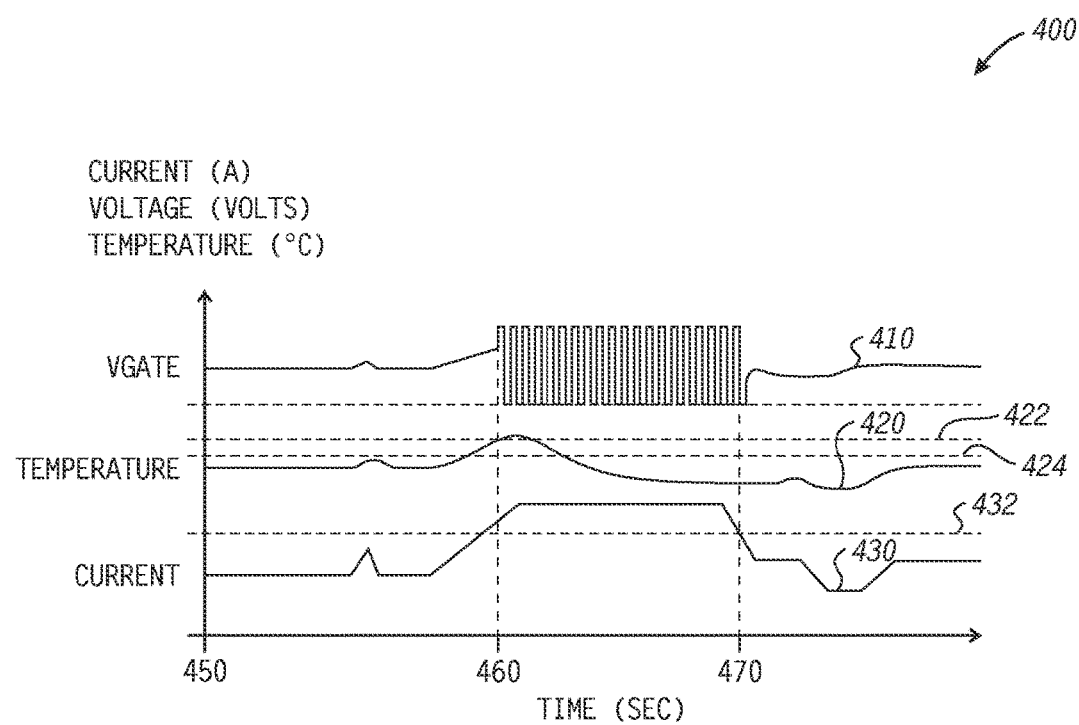
FIG. 4 is a timing diagram illustrating the operation of the battery charger of FIG. 2.

FIG. 4 is a timing diagram 400 illustrating the operation of battery charger 200 of FIG. 2. Timing diagram 400 has a horizontal axis representing time in seconds, and a vertical axis representing current, voltage, and temperature in amperes, volts, and degrees Celsius, as appropriate. Timing diagram 400 includes a waveform 410 labeled "VGATE," representing the signal provided to the gate of transistor 220 by dual-mode driver 236, a waveform 420 labeled "TEMPERATURE," representing the temperature provided by temperature sensor 280, and a waveform 430 labeled "CURRENT," representing the current delivered to battery 270. Timing diagram 400 further includes a temperature threshold 422 representing a temperature of 110° C., a temperature threshold 424 representing a temperature of 80° C., a current threshold 432 representing a current of 500 mA, and time references 450, 460, and 470.

At time reference 450, battery charger circuit 210 is operating in linear mode using constant-current regulation, such as represented by block 330 at FIG. 3. Dual-mode driver 236 varies signal VGATE 420 to keep signal CURRENT substantially constant, and transistor 220 therefore provides an approximately constant current to battery 270. The linear mode of operation is less efficient than the switching mode and can result in overheating of battery charger circuit 210. At time reference 460, the temperature of battery charger circuit 210 as indicated by signal TEMPERATURE 420 has increased to 110 C, corresponding to temperature threshold 422. This situation is represented by decision block 332 in FIG. 3. The voltage at battery 270 is below 4.2 volts (not shown), so decision block 352 is resolved in the affirmative. Regulation circuit 232 responds to the high-temperature situation by configuring control and regulation circuit 230 to operate in switching mode using constant-current regulation, such as represented by block 360 at FIG. 3.

While operating in the switching mode, control and regulation circuit 230 provides signal VGATE 410 as a PWM signal with a duty cycle operable to maintain the desired constant charging current. Shortly before time reference 470, the voltage at battery 270 has reached 4.2 volts (not shown) and the charging current, indicated by signal CURRENT, begins to decrease. At time reference 470 signal CURRENT has decreased to below 500 mA, as indicated by current threshold 432, and represented by decision block 362 in FIG. 3. Furthermore, the temperature of battery charger circuit 210 has decreased below 80° C. as indicated by temperature threshold 424, and represented by decision block 364 at FIG. 3. The voltage at battery 270 has reached 4.2 volts, so regulation circuit 232 configures control and regulation circuit 230 to operate in a linear mode using constant-voltage regulation, such as represented by block 340 at FIG. 3. Battery charger circuit 210 continues to operate in this state until the charging current, battery voltage, or charger temperature changes, causing a mode change according to the flow of FIG. 3.

Battery charger circuit 210 is operable to charge battery 270 while the associated electronic device is functioning. Furthermore, battery charger circuit 210 can supply power to the electronic device when the user has removed battery. Battery charger circuit 210 responds to fluctuating current demands appropriately by assuming a suitable operating mode.

The above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A battery charger circuit comprising:
    a transistor having a first current electrode for receiving a charging voltage, a control electrode for receiving a first control signal, and a second current electrode for providing an output voltage;
    a rectifier having a first terminal coupled to said second current electrode of said transistor, and a second terminal coupled to a power supply voltage terminal; and
    a control and regulation circuit having a first input for receiving a first feedback signal representative of a temperature, a second input for receiving a second feedback signal representative of a battery voltage, and a first output for providing said first control signal,
    when the battery charger circuit is coupled to a battery charging source of a first type said control and regulation circuit operating in a linear mode if said temperature is less than a first temperature threshold and in a switching mode otherwise; and
    when the battery charger circuit is coupled to a battery charging source of a second type said control and regulation circuit operating in said switching mode if said battery voltage is less than a voltage threshold, and changing from said switching mode to said linear mode if said battery voltage substantially reaches said voltage threshold if said temperature is below said first temperature threshold.

2. The battery charger circuit of claim 1 wherein said first type comprises a wall charging source, and said second type comprises a universal serial bus (USB) type.

3. The battery charger circuit of claim 1 wherein when said charging source is said first type and said temperature is less than said first temperature threshold, said control and regulation circuit operating in a linear, constant current mode if said battery voltage is less than said voltage threshold, and operating in a linear, constant voltage mode if said battery voltage is not less than said voltage threshold.

4. The battery charger circuit of claim 3 wherein said control and regulation circuit continues to operate in said linear mode as long as said temperature is less than said first temperature threshold.

5. The battery charger circuit of claim 3 wherein said voltage threshold is 4.2 volts.

6. The battery charger circuit of claim 3 wherein said first type comprises a wall charging source.

7. The battery charger circuit of claim 1 wherein when said charging source is said first type and said temperature is not less than said first temperature threshold, said control and regulation circuit operating in a switching, constant current mode if said battery voltage is less than said voltage threshold, and operating in a switching, constant voltage mode if said battery voltage is not less than said voltage threshold.

8. The battery charger circuit of claim 7 wherein if said control and regulation circuit operates in said switching mode, said control and regulation circuit continues to operate in said switching mode if said temperature is not less than a second temperature threshold.

9. The battery charger circuit of claim 8 wherein said first temperature threshold is 110 degrees Celsius and said second temperature threshold is 80 degress Celsius.

10. The battery charger circuit of claim 7 wherein if said control and regulation circuit operates in said switching mode, said control and regulation circuit continues to operate in said switching mode if a battery current is not less than a predetermined current.

11. The battery charger circuit of claim 1 wherein when said charging source is said second type, said control and regulation circuit operating in a switching, constant current mode if said battery voltage is less than said voltage threshold.

12. The battery charger circuit of claim 11 wherein said control and regulation circuit continuing to operate in said switching, constant current mode while said battery voltage remains less than said voltage threshold.

13. The battery charger circuit of claim 12 wherein said control and regulation circuit changes from said switching, constant current mode to a linear, constant voltage mode if said temperature is less than said first temperature threshold and said battery voltage is not less than said voltage threshold.

14. The battery charger circuit of claim 13 wherein said control and regulation circuit remains in said linear, constant voltage mode while said temperature is less than said first temperature threshold and said battery voltage is not less than said voltage threshold.

15. The battery charger circuit of claim 11 wherein said control and regulation circuit changes from said switching, constant current mode to a switching, constant voltage mode if said battery voltage is not less than said voltage threshold and if said temperature is not less than said first temperature threshold.

16. The battery charger circuit of claim 15 wherein said control and regulation circuit remains in said switching, constant voltage mode while said temperature is less than a second temperature threshold.

17. The battery charger circuit of claim 16 wherein said first temperature threshold is 110 degrees Celsius and said second temperature threshold is 80 degress Celsius.

18. The battery charger circuit of claim 15 wherein said control and regulation circuit remains in said switching, constant voltage mode while said battery voltage is less than said voltage threshold.

19. The battery charger circuit of claim 18 wherein said voltage threshold is 4.2 volts.

20. The battery charger circuit of claim 11 wherein said first type comprises a universal serial bus (USB) type.

\* \* \* \* \*